US012109833B2

(12) United States Patent
Tominaga

(10) Patent No.: US 12,109,833 B2
(45) Date of Patent: Oct. 8, 2024

(54) ADHESIVE FOR HEAT-SENSITIVE SCREEN MASTER, HEAT-SENSITIVE SCREEN MASTER, AND METHOD FOR PRODUCING HEAT-SENSITIVE SCREEN MASTER

(71) Applicant: RISO KAGAKU CORPORATION, Tokyo (JP)

(72) Inventor: Hirotaka Tominaga, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 465 days.

(21) Appl. No.: 16/715,728

(22) Filed: Dec. 16, 2019

(65) Prior Publication Data

US 2020/0207143 A1 Jul. 2, 2020

(30) Foreign Application Priority Data

Dec. 27, 2018 (JP) ................................ 2018-244374

(51) Int. Cl.

| | |
|---|---|
| ***B41N 1/24*** | (2006.01) |
| ***C09J 175/04*** | (2006.01) |
| *B32B 5/02* | (2006.01) |
| *B32B 7/12* | (2006.01) |
| *B32B 27/12* | (2006.01) |
| *B32B 37/12* | (2006.01) |

(52) U.S. Cl.

CPC ............ *B41N 1/241* (2013.01); *C09J 175/04* (2013.01); *B32B 5/028* (2013.01); *B32B 7/12* (2013.01); *B32B 27/12* (2013.01); *B32B 2037/1269* (2013.01)

(58) Field of Classification Search

CPC ................ C09D 175/04; C09D 171/02; B29C 65/4835; B41N 1/241; B41N 1/24

See application file for complete search history.

(56) References Cited

U.S. PATENT DOCUMENTS

| | | | | |
|---|---|---|---|---|
| 4,961,377 A * | 10/1990 | Bando | B41N 1/241 | 101/128.21 |
| 5,875,711 A | 3/1999 | Tateishi et al. | | |
| 6,000,331 A | 12/1999 | Ota | | |
| 6,080,484 A * | 6/2000 | Ujiie | B41N 1/247 | 428/397 |
| 9,840,576 B2 | 12/2017 | Aou et al. | | |
| 2010/0136346 A1* | 6/2010 | Gurke | C08G 18/42 | 428/423.1 |

FOREIGN PATENT DOCUMENTS

| | | | |
|---|---|---|---|
| JP | H10-086546 | 4/1998 | |
| JP | 2006-213801 | 8/2006 | |
| JP | 2010-214635 | 9/2010 | |
| JP | 2016-510348 | 4/2016 | |
| WO | 2018/101242 | 6/2018 | |
| WO | WO-2018193957 A1 * | 10/2018 | C08G 18/10 |

OTHER PUBLICATIONS

Japanese Office Action, issued in the corresponding Japanese application No. 2018-244374, dated Oct. 4, 2022, 6 pages (including machine translation).

Office Action issued for Japanese Patent Application No. 2018-244374, Feb. 21, 2023, 9 paged including machine translation.

* cited by examiner

*Primary Examiner* — Gregory Listvoyb

(74) *Attorney, Agent, or Firm* — HSML P.C.

(57) ABSTRACT

An adhesive for a heat-sensitive screen master is disclosed, the adhesive containing at least one selected from the group consisting of a urethane prepolymer and a polyol, and a polyisocyanate, wherein the mass ratio (A:B) between the at least one (A) selected from the group consisting of a urethane prepolymer and a polyol, and the polyisocyanate (B) is within a range from 35:65 to 5:95. A heat-sensitive screen master and a method for producing a heat-sensitive screen master are also disclosed.

16 Claims, No Drawings

ADHESIVE FOR HEAT-SENSITIVE SCREEN MASTER, HEAT-SENSITIVE SCREEN MASTER, AND METHOD FOR PRODUCING HEAT-SENSITIVE SCREEN MASTER

CROSS REFERENCE TO RELATED APPLICATIONS

This application is based upon and claims the benefit of priority from the prior Japanese Patent Application No. 2018-244374, filed on Dec. 27, 2018, the entire contents of which are incorporated by reference herein.

BACKGROUND OF THE INVENTION

Field of the Invention

Embodiments of the present invention relate to an adhesive for a heat-sensitive screen master, a heat-sensitive screen master, and a method for producing a heat-sensitive screen master.

Description of the Related Art

A platemaking method for producing a plate for stencil printing (for example, screen printing), in which a thermoplastic resin film of a heat-sensitive stencil master (for example, heat-sensitive screen master) including the thermoplastic resin film and a porous support bonded together is perforated by performing selective heating and melting with a thermal head, thereby forming perforations corresponding with an image, is known as thermal platemaking.

For example, a heat-sensitive screen master in which a screen printing mesh is used as the porous support may be used as the heat-sensitive screen master.

JP H10-86546 A discloses an example of a heat-sensitive screen master in which a polyester film having a thickness of 1.5 to 2 μm and a screen printing mesh are bonded together using an adhesive in which a polyisocyanate resin as a curing agent and an unsaturated polyester resin having an amine are used in combination.

JP 2010-214635 A discloses a stencil paper for screen printing in which the thermoplastic synthetic resin film has a thickness of 3 to 5 μm, the adhesive is composed of a polyurethane-containing main agent and a curing agent containing tolylene diisocyanate and a urethane resin, and is a two-part adhesive in which an amount of the curing agent equivalent to a solid content of 110 to 160 parts by weight is blended with 100 parts by weight of the main agent, and the stencil paper is prepared by dipping a screen printing mesh in a bath of the adhesive, thereby coating both surfaces of the mesh including the perforations thereof with the adhesive, and then bonding the polyester film to one surface of the screen printing mesh.

SUMMARY OF THE INVENTION

An embodiment of the present invention relates to an adhesive for a heat-sensitive screen master, the adhesive containing at least one selected from the group consisting of a urethane prepolymer and a polyol, and a polyisocyanate, wherein the mass ratio (A:B) between the at least one (A) selected from the group consisting of a urethane prepolymer and a polyol, and the polyisocyanate (B) is within a range from 35:65 to 5:95.

Another embodiment of the present invention relates to a heat-sensitive screen master that includes a screen printing mesh, an adhesive layer formed using the adhesive for a heat-sensitive screen master of the embodiment described above, and a thermoplastic resin film.

Another embodiment of the present invention relates to a method for producing a heat-sensitive screen master, the method including bonding a screen printing mesh and a thermoplastic resin film using the adhesive for a heat-sensitive screen master of the embodiment described above.

DETAILED DESCRIPTION OF THE EMBODIMENTS

Embodiments of the present invention are described below in detail, but the present invention is of course not limited to these embodiments, and various modifications and alterations may be applied.

<Adhesive for Heat-Sensitive Screen Master>

An adhesive for a heat-sensitive screen master according to one embodiment contains at least one selected from the group consisting of a urethane prepolymer and a polyol (hereafter sometimes referred to as "the component A"), and a polyisocyanate (hereafter sometimes referred to as "the component B"), wherein the mass ratio (A:B) between the at least one (A) selected from the group consisting of a urethane prepolymer and a polyol, and the polyisocyanate (B) is within a range from 35:65 to 5:95.

When a heat-sensitive screen master is subjected to platemaking and printing is performed using the thus obtained plate, if printing is performed, for example, using a solvent ink in which the main solvent is a volatile organic solvent, then the solvent of the residual solvent ink left on the master following printing evaporates, making it more likely for the solid fraction to remain in the form of aggregates. However, if the aggregated ink left on the master following printing is wiped with a solvent, then the adhesive that bonds together the thermoplastic resin film and the screen printing mesh can sometimes dissolve, causing the thermoplastic synthetic resin film to detach from the screen printing mesh, and therefore repeated use of the produced master is sometimes difficult.

Furthermore, during printing, the organic solvent contained in the ink can sometimes affect the adhesive that bonds together the thermoplastic resin film and the screen printing mesh.

The adhesive for a heat-sensitive screen master according to the present embodiment contains a relatively large amount of the polyisocyanate such that the mass ratio (A:B) between the at least one (A) selected from the group consisting of a urethane prepolymer and a polyol, and the polyisocyanate (B) is within a range from 35:65 to 5:95. As a result, by using this adhesive for a heat-sensitive screen master, a layer having a high density of crosslinking formed by reactions between polyisocyanate molecules can be obtained, meaning the solvent resistance can be improved.

This adhesive for a heat-sensitive screen master contains at least a prescribed proportion of at least one selected from the group consisting of a urethane prepolymer and a polyol such that the mass ratio (A:B) between the at least one (A) selected from the group consisting of a urethane prepolymer and a polyol, and the polyisocyanate (B) is within a range from 35:65 to 5:95. Accordingly, the adhesive for a heat-sensitive screen master may exhibit excellent adhesive strength.

Because the adhesive for a heat-sensitive screen master according to the present embodiment exhibits excellent adhesive strength, satisfactory adhesive strength can be obtained even with an adhesive surface area that is less than that obtained by a method in which the screen printing mesh is dipped in a bath of the adhesive. When the adhesive surface area is reduced, blockages of perforations by the adhesive during platemaking may be reduced, meaning the platemaking properties may be improved.

The adhesive for a heat-sensitive screen master may contain, as the component A, only a urethane prepolymer or only a polyol, or may contain a combination of both a urethane prepolymer and a polyol.

A material that is compatible with the component B may be preferably used as the component A. The component A is preferably a liquid at 23° C.

The urethane prepolymer can be obtained by reaction of a polyol component and an isocyanate component, and may contain a hydroxyl group (—OH), an isocyanate group (—NCO), or both of these groups.

The urethane prepolymer is preferably a liquid at 23° C.

The weight average molecular weight of the urethane prepolymer is not particularly limited, but is preferably from 2,000 to 10,000, and more preferably from 3,000 to 8,000. The weight average molecular weight of the urethane prepolymer is a polystyrene-equivalent value determined by gel permeation chromatography (GPC).

The viscosity of the urethane prepolymer at 25° C. and at a shear rate of 500/s is preferably not more than 200,000 mPa·s. The viscosity of the urethane prepolymer at 25° C. and at a shear rate of 500/s is more preferably not more than 100,000 mPa·s, and is further preferably 80,000 mPa·s or less. Although there are no particular limitations on the lower limit provided the urethane prepolymer is in a liquid state, the viscosity of the urethane prepolymer at 25° C. and at a shear rate of 500/s may be, for example, at least 5,000 mPa·s.

Examples of commercially available products for the urethane prepolymer include TAKELAC A-666 and TAKELAC A-695 (both product names) manufactured by Mitsui Chemicals Inc.

A single urethane prepolymer may be used alone, or a combination of two or more urethane prepolymers may be used.

The polyol is preferably a liquid at 23° C.

There are no particular limitations on the polyol, and any polyol having two or more hydroxyl group may be used. The polyol preferably has a hydroxyl group at both terminals.

For example, the types of polyols typically used as raw materials for polyurethane resins may be used as the polyol.

Examples of the polyol include polyester polyols, polyether polyols, polycarbonate polyols, polyacetal polyols, polyacrylate polyols, polyesteramide polyols, polythioether polyols and polyolefin polyols such as polybutadiene polyols, and of these, polyether polyols, polyester polyols and polycarbonate polyols having hydroxyl groups at both terminals are preferred.

Examples of commercially available products for the polyol include EXCENOL 750ED (a polyether polyol) manufactured by AGC Group, ADEKA NEWACE #50 (a polyester polyol) manufactured by ADEKA Corporation, and DURANOL G3452 (a polycarbonate polyol) manufactured by Asahi Kasei Corporation.

A single polyol may be used alone, or a combination of two or more polyols may be used.

From the viewpoint of improving the adhesive strength, the amount of the component A relative to the total mass of the adhesive for a heat-sensitive screen master is preferably at least 5% by mass, and is more preferably 10% by mass or greater.

On the other hand, the amount of the component A relative to the total mass of the adhesive for a heat-sensitive screen master is preferably not more than 35% by mass, and is more preferably 30% by mass or less.

For example, the amount of the component A relative to the total mass of the adhesive for a heat-sensitive screen master is preferably from 5 to 35% by mass, and more preferably from 10 to 30% by mass.

In those cases where the adhesive for a heat-sensitive screen master contains a solvent described below, the amount of the component A may, for example, satisfy the range described above, or may be from 5 to 35% by mass, or from 10 to 30% by mass, relative to the mass obtained by subtracting the mass of the solvent from the total mass of the adhesive for a heat-sensitive screen master.

From the viewpoint of improving the adhesive strength, the amount of the component A relative to the total mass of the component A and the component B is preferably at least 5% by mass, and is more preferably 10% by mass or greater.

The adhesive for a heat-sensitive screen master may contain a polyisocyanate as the component B.

Any polyisocyanate having two or more isocyanate groups may be used as the polyisocyanate. The polyisocyanate preferably has a isocyanate group at a terminal. A polyisocyanate compatible with the component A may be preferably used as the polyisocyanate. The polyisocyanate is preferably a liquid at 23° C.

The polyisocyanate may be, for example, an aliphatic polyisocyanate, an alicyclic polyisocyanate, or an aromatic polyisocyanate or the like.

Specific examples of the polyisocyanate include diisocyanates such as hexamethylene diisocyanate (1,6-diisocyanatohexane) (HDI), 1,3-bis(isocyanatomethyl)benzene, 1,3-bis(isocyanatomethyl)cyclohexane, 1,5-naphthalene diisocyanate, diphenylmethane-4,4-diisocyanate, meta-xylene diisocyanate, 4,4'-methylenebis(phenylene isocyanate) (MDI), and tolylene diisocyanate (TDI); triisocyanates such as 1-methylbenzene-2,4,6-triyl triisocyanate and 1,6,11-triisocyanatoundecane; and polymethylene polyphenyl polyisocyanate; as well as modified products of these polyisocyanates.

From the viewpoint of improving the solvent resistance, a modified product of a polyisocyanate is preferred as the polyisocyanate. Examples of modified products of polyisocyanate include isocyanurate-modified products, biuret-modified products, allophanate-modified products and oxadiazinetrione-modified products of polyisocyanates. From the viewpoint of improving the solvent resistance, an isocyanurate-modified product of a polyisocyanate or a biuret-modified product of a polyisocyanate is preferred, and an isocyanurate-modified product of a polyisocyanate is more preferred.

Because isocyanurate-modified products of polyisocyanates may exhibit a low degree of freedom of rotation for the N—C bond, they are more likely to form a hard coating film, and are therefore more likely to be resistant to solvent permeation.

From the viewpoint of improving the solvent resistance, the polyisocyanate modified product is preferably a modified product of an aliphatic polyisocyanate, is more preferably a modified product of an aliphatic diisocyanate, and is even more preferably a modified product of hexamethylene diisocyanate. For example, an isocyanurate-modified product of hexamethylene diisocyanate or a biuret-modified product of hexamethylene diisocyanate is preferred, and from the viewpoint of improving the solvent resistance, an isocyanurate-modified product of hexamethylene diisocyanate is particularly preferred.

Examples of commercially available products for the polyisocyanate include DURANATE TPA-100 (an isocyanurate-modified product of hexamethylene diisocyanate) and DURANATE 24A-100 (a biuret-modified product of hexamethylene diisocyanate) manufactured by Asahi Kasei Corporation, and LUPRANATE MI (4,4'-methylenebis(phenylene isocyanate)) and LUPRANATE TDI (tolylene diisocyanate) manufactured by BASF INOAC Polyurethanes Ltd.

A single polyisocyanate may be used alone, or a combination of two or more polyisocyanates may be used.

From the viewpoint of improving the solvent resistance, the amount of the component B relative to the total mass of the adhesive for a heat-sensitive screen master is preferably at least 65% by mass, and more preferably 70% by mass or greater.

On the other hand, the amount of the component B relative to the total mass of the adhesive for a heat-sensitive screen master is preferably not more than 95% by mass, and more preferably 90% by mass or less.

For example, the amount of the component B relative to the total mass of the adhesive for a heat-sensitive screen master is preferably from 65 to 95% by mass, and more preferably from 70 to 90% by mass.

In those cases where the adhesive for a heat-sensitive screen master contains a solvent described below, the amount of the component B may, for example, satisfy the range described above, or may be from 65 to 95% by mass, or from 70 to 90% by mass, relative to the mass obtained by subtracting the mass of the solvent from the total mass of the adhesive for a heat-sensitive screen master.

From the viewpoint of improving the solvent resistance, the amount of the component B relative to the total mass of the component A and the component B is preferably at least 65% by mass, and more preferably 70% by mass or greater.

From the viewpoints of improving the adhesive strength and improving the solvent resistance, the mass ratio (A:B) between the component (A) and the component (B) is preferably within a range from 35:65 to 5:95, and more preferably within a range from 30:70 to 10:90.

The adhesive for a heat-sensitive screen master may, for example, contain a solvent as a diluent. An organic solvent is preferred as the solvent.

Examples of the organic solvent include aliphatic hydrocarbon-based solvents, aromatic hydrocarbon-based solvents, alcohol-based solvents, ketone-based solvents, ester-based solvents, ether-based solvents, aldehyde-based solvents, carboxylic acid-based solvents, amine-based solvents, low-molecular weight heterocyclic compound-based solvents and oxide-based solvents, and specific examples include hexane, heptane, octane, benzene, toluene, xylene, methyl alcohol, ethyl alcohol, isopropyl alcohol, n-propyl alcohol, butyl alcohol, ethylene glycol, diethylene glycol, propylene glycol, glycerol, acetone, methyl ethyl ketone, ethyl acetate, propyl acetate, ethyl ether, tetrahydrofuran, 1,4-dioxane, formic acid, acetic acid, propionic acid, formaldehyde, acetaldehyde, methylamine, ethylenediamine, dimethylformamide, pyridine, and ethylene oxide.

There are no particular limitations on the amount of the solvent, and the solvent may be included, for example, in an amount that results in a total mass of the component A, the component B and the solvent that exceeds 1-fold but is not more than 3,000-fold of the total mass of the component A and the component B.

From the viewpoints of the solvent resistance and the platemaking properties, the amount of the solvent relative to the total mass of the adhesive for a heat-sensitive screen master is preferably not more than 5% by mass, more preferably not more than 2% by mass, and may be 0% by mass.

On the other hand, the amount of the solvent relative to the total mass of the adhesive for a heat-sensitive screen master may be at least 0.1% by mass.

For example, the amount of the solvent relative to the total mass of the adhesive for a heat-sensitive screen master may be within a range from 0.1 to 5% by mass, or from 0.1 to 2% by mass.

The adhesive for a heat-sensitive screen master may, according to need, also contain one or more additives. Examples of the additives includes an antistatic agent, a lubricant, a tackifiers, a filler and a leveling agent.

The adhesive for a heat-sensitive screen master is preferably a two-part adhesive in which the component A and the component B are stored separately. The component A and the component B are preferably mixed at the time of use.

In those cases where the adhesive for a heat-sensitive screen master is a two-part adhesive, other components besides the component A and the component B may be stored together with the component A and/or the component B, or may be stored separately. For example, when a solvent is included as a diluent, the solvent may be stored together with the component A and/or the component B, or may be mixed with the component A and the component B at the time of use.

<Heat-Sensitive Screen Master>

A heat-sensitive screen master of an embodiment is a heat-sensitive screen master in which the adhesive for a heat-sensitive screen master described above is used.

The heat-sensitive screen master of an embodiment includes a screen printing mesh, an adhesive layer formed using the adhesive for a heat-sensitive screen master described above, and a thermoplastic resin film.

This heat-sensitive screen master may exhibit excellent adhesive strength and solvent resistance.

The heat-sensitive screen master is preferably a heat-sensitive screen master in which the screen printing mesh and the thermoplastic resin film are bonded together using the adhesive for a heat-sensitive screen master described above, so that the screen printing mesh and the thermoplastic resin film are bonded together via an adhesive layer formed using the aforementioned adhesive for a heat-sensitive screen master.

The screen printing mesh may be any mesh that undergoes substantially no perforation upon heating with a thermal head and enables ink to pass through the mesh during printing, and for example, meshes produced from fibers of polyester, nylon, rayon, stainless steel, silk, or cotton or the like may be used.

The thickness of the screen printing mesh is typically from 40 to 270 μm, and is preferably from 50 to 150 μm.

The mesh count (the number of fibers per one inch) of the screen printing mesh is typically from 40 to 500, and 50 to 350 mesh is preferred. The mesh counts in the longitudinal direction and the transverse direction may be the same or different, provided they each fall within the above mesh count range.

Examples of films that may be used as the thermoplastic resin film include polyethylene-based resin films, polypropylene-based resin films, polyester-based resin films, polyamide-based resin films, polyvinyl chloride-based resin films, and polyvinylidene chloride-based resin films. Among these, polyester-based resin films can be used favorably. Specific examples of polyester-based resin films include polyethylene terephthalate-based resin films, polyethylene-2,6-naphthalate-based resin films, polybutylene terephthalate-based resin films, ethylene terephthalate/ethylene isophthalate copolymer-based resin films, butylene terephthalate/ethylene terephthalate copolymer-based resin films, butylene terephthalate/hexamethylene terephthalate copolymer-based resin films, hexamethylene terephthalate/1,4-cyclohexanedimethylene terephthalate copolymer-based resin films, and ethylene terephthalate/ethylene-2,6-naphthalate copolymer-based resin films. The thermoplastic resin film may, according to need, also contain various additives such as pigments, viscosity adjusters, dispersants, dyes, lubricants, crosslinking agents and plasticizers.

The thickness of the thermoplastic resin film may be any thickness that enables thermal digital screen platemaking, but is typically within a range from 0.5 to 10 μm, and is preferably from 1 to 5 μm.

The thermoplastic resin film preferably exhibits shrinkage properties that are suitable for facilitating melt perforation by thermal digital screen platemaking, and may be a uniaxially or biaxially stretched film as appropriate.

The heat-sensitive screen master can be produced, for example, by a method that includes bonding the screen printing mesh and the thermoplastic resin film using the adhesive for a heat-sensitive screen master described above.

The adhesive for a heat-sensitive screen master is preferably prepared by mixing together the component A, the component B, and any other components as required, immediately prior to use.

There are no particular limitations on the method used for bonding the screen printing mesh and the thermoplastic resin film using the adhesive for a heat-sensitive screen master described above. For example, the adhesive for a heat-sensitive screen master may be applied using a roll coater or the like, and the screen printing mesh and the thermoplastic resin film then may be bonded together using the adhesive for a heat-sensitive screen master.

There are no particular limitations on the method used for applying the adhesive for a heat-sensitive screen master. For example, the adhesive for a heat-sensitive screen master may be applied to the screen printing mesh using a roll coater or the like, or the adhesive may be applied to the screen printing mesh by dipping the screen printing mesh in a diluted adhesive for a heat-sensitive screen master that has been diluted with a solvent.

The amount applied of the adhesive for a heat-sensitive screen master is typically within a range from 0.05 to 10.0 g/m$^2$. From the viewpoint of the adhesive strength, the amount applied is preferably at least 0.05 g/m$^2$. From the viewpoints of the ink passability and achieving favorable perforations, the amount applied is preferably not more than 10.0 g/m$^2$.

Following bonding of the screen printing mesh and the thermoplastic resin film using the adhesive for a heat-sensitive screen master, the product is preferably dried. The drying conditions are, for example, preferably from 30° C. to 60° C. (for example, 50° C.). The drying time is preferably from 1 to 5 days (for example, 3 days).

This heat-sensitive screen master can undergo platemaking using a thermal platemaking device that uses a thermal head, and the obtained plate can be used as a plate for screen printing or stencil printing.

Using the plate obtained by subjecting this heat-sensitive screen master to platemaking, stencil printing such as screen printing can be performed. Examples of inks that may be used for the printing include stencil printing inks such as a screen printing ink. Examples of such ink include oil-based inks, solvent inks, aqueous inks, water-in-oil (W/O) emulsion inks, oil-in-water (O/W) emulsion inks and plastisol inks.

EXAMPLES

The present invention is described below in further detail based on a series of examples and comparative examples, but the present invention is not limited solely to these examples. Unless specifically stated otherwise, "%" refers to "% by mass". Blend amounts for the various components in the tables also represent "% by mass" values.

1. Adhesive for Heat-Sensitive Screen Master

The compositions of adhesives for heat-sensitive screen masters of various examples and comparative examples are shown in Tables 1 to 3. The blend amount of each component in Tables 1 to 3 indicates a % by mass value. The adhesives for heat-sensitive screen masters of the various examples and comparative examples were prepared for use by mixing the components shown in Tables 1 to 3 in the proportions shown in Tables 1 to 3. In Tables 1 and 2, "Ex." indicates "Example".

Details of each of the components listed in Tables 1 to 3 are shown below.

TAKELAC A-666: a urethane prepolymer (manufactured by Mitsui Chemicals Inc.)

TAKELAC A-695: a urethane prepolymer (manufactured by Mitsui Chemicals Inc.)

EXCENOL 750ED: a polyether polyol (manufactured by AGC Group)

ADEKA NEWACE #50: a polyester polyol (manufactured by ADEKA Corporation)

DURANOL G3452: a polycarbonate polyol (manufactured by Asahi Kasei Corporation)

DURANATE TPA-100: an isocyanurate-modified product of hexamethylene diisocyanate (HDI) (manufactured by Asahi Kasei Corporation)

DURANATE 24A-100: a biuret-modified product of hexamethylene diisocyanate (HDI) (manufactured by Asahi Kasei Corporation)

LUPRANATE MI: 4,4'-methylenebis(phenylene isocyanate) (MDI) (manufactured by BASF INOAC Polyurethanes Ltd.)

LUPRANATE TDI: tolylene diisocyanate (TDI) (manufactured by BASF INOAC Polyurethanes Ltd.)

Methyl ethyl ketone: manufactured by Junsei Chemical Co., Ltd.

2. Production of Heat-Sensitive Screen Master

Each of the adhesives for a heat-sensitive screen master described above was applied using a roll coater in a coating amount of 0.05 to 10.0 g/m$^2$, and a polyester screen printing mesh of thickness 73 μm (mesh count: #200, wire diameter: 48 μm) ("79/200-48" manufactured by Nippon Tokushu Fabric Inc.) and a biaxially stretched polyester film of thickness 2 μm were bonded together, and the resulting product was then dried at 50° C. for 3 days in an aging room, thus completing production of a heat-sensitive screen master.

3. Evaluations

Using the adhesive for a heat-sensitive screen master or the heat-sensitive screen master obtained in each example and comparative example, the adhesive strength, the solvent resistance, and the platemaking properties were evaluated using the methods described below. The results are shown in Tables 1 to 3.

<Adhesive Strength>

The adhesive strength was evaluated using the heat-sensitive screen master of each example and comparative example. Specifically, an adhesive tape was affixed to the thermoplastic resin film side of the heat-sensitive screen master, and following detachment of the end portions of the screen printing mesh and the thermoplastic resin film, the laminate peel strength was measured using a STROGRAPH VGS 05-D manufactured by Toyo Seiki Seisaku-sho, Ltd., and the obtained result was evaluated based on the following evaluation criteria.

A: 100 gf/25 mm or greater

B: at least 60 gf/25 mm but less than 100 gf/25 mm

C: less than 60 gf/25 mm

<Solvent Resistance>

The solvent resistance was evaluated using the adhesive for a heat-sensitive screen master of each example and comparative example. Specifically, a bar coater was used to apply the adhesive for a heat-sensitive screen master to a base film (LUMIRROR 125U98 manufactured by Toray Industries, Inc.) with a coating thickness of 5 μm, and following drying for one day in a 60° C. constant-temperature chamber, drying was continued for one day in a constant-temperature chamber at 30° C. and 80% RH.

The thus obtained coating film was immersed in toluene for 15 minutes, the change in weight of the coating film from before to after toluene immersion was measured, and the absolute value was evaluated based on the following evaluation criteria.

S: 0.5% or less

A: greater than 0.5% but not more than 2.00

B: greater than 2.0% but not more than 5.0%

C: greater than 5.0%

<Platemaking Properties>

Using the heat-sensitive screen master of each example and comparative example, a heat-sensitive platemaking machine (GOCCOPRO QS2536 manufactured by RISO KAGAKU CORPORATION) was used to make a solid pattern.

The solid perforated portion of the obtained plate was photographed under a microscope, and image processing software "Image Pro Plus" (produced by Media Cybernetics, Inc) was used to binarize the apertures and the film residue portions, and the solid aperture ratio was calculated. The calculated solid aperture ratio was evaluated based on the following evaluation criteria.

S: 70% or greater

A: at least 65% but less than 70%

B: at least 600 but less than 65%

C: less than 60%

TABLE 1

| | | | Mass (%) | Ex. 1 | Ex. 2 | Ex. 3 | Ex. 4 | Ex. 5 | Ex. 6 |
|---|---|---|---|---|---|---|---|---|---|
| Component A | Urethane prepolymer | — | TAKELAC A-666 | | | | 20 | | |
| | | | TAKELAC A-695 | | | | | 20 | |
| | Polyol | Polyether polyol | EXCENOL 750ED | | | | | | 20 |
| | | Polyester polyol | ADEKA NEWACE #50 | | | | | | |
| | | Polycarbonate polyol | DURANOL G3452 | 35 | 20 | 5 | | | |
| Component B | Isocyanate | HDI isocyanurate-modified product | DURANATE TPA-100 | 65 | 80 | 95 | 80 | 80 | 80 |
| | | HDI biuret-modified product | DURANATE 24A-100 | | | | | | |
| | | MDI | LUPRANATE MI | | | | | | |
| | | TDI | LUPRANATE TDI | | | | | | |
| Diluent | Solvent | Methyl ethyl ketone | | | | | | | |
| | Total (mass %) | | | 100 | 100 | 100 | 100 | 100 | 100 |
| Evaluation results | Adhesive strength | | | A | A | B | A | A | A |
| | Solvent resistance | | | B | S | S | S | S | S |
| | Platemaking properties | | | A | A | A | A | A | A |

TABLE 2

| | | | Mass (%) | Ex. 7 | Ex. 8 | Ex. 9 | Ex. 10 | Ex. 11 |
|---|---|---|---|---|---|---|---|---|
| Component A | Urethane prepolymer | — | TAKELAC A-666 | | | | | |
| | | | TAKELAC A-695 | | | | | |
| | Polyol | Polyether polyol | EXCENOL 750ED | | | | | |
| | | Polyester polyol | ADEKA NEWACE #50 | 20 | | | | |
| | | Polycarbonate polyol | DURANOL G3452 | | 20 | 20 | 20 | 19 |

TABLE 2-continued

| | | | Mass (%) | Ex. 7 | Ex. 8 | Ex. 9 | Ex. 10 | Ex. 11 |
|---|---|---|---|---|---|---|---|---|
| Component B | Isocyanate | HDI isocyanurate-modified product | DURANATE TPA-100 | 80 | | | | 76 |
| | | HDI biuret-modified product | DURANATE 24A-100 | | 80 | | | |
| | | MDI | LUPRANATE MI | | | 80 | | |
| | | TDI | LUPRANATE TDI | | | | 80 | |
| Diluent | Solvent | Methyl ethyl ketone | | | | | | 5 |
| | Total (mass %) | | | 100 | 100 | 100 | 100 | 100 |
| Evaluation results | Adhesive strength | | | A | A | A | A | A |
| | Solvent resistance | | | S | A | B | B | B |
| | Platemaking properties | | | A | A | A | A | B |

TABLE 3

| | | | Mass (%) | Comparative Example 1 | Comparative Example 2 |
|---|---|---|---|---|---|
| Component A | Urethane prepolymer | — | TAKELAC A-666 | | |
| | | | TAKELAC A-695 | | |
| | Polyol | Polyether polyol | EXCENOL 750ED | | |
| | | Polyester polyol | ADEKA NEWACE #50 | | |
| | | Polycarbonate polyol | DURANOL G3452 | 45 | |
| Component B | Isocyanate | HDI isocyanurate-modified product | DURANATE TPA-100 | 55 | 100 |
| | | HDI biuret-modified product | DURANATE 24A-100 | | |
| | | MDI | LUPRANATE MI | | |
| | | TDI | LUPRANATE TDI | | |
| Diluent | Solvent | Methyl ethyl ketone | | | |
| | Total (mass %) | | | 100 | 100 |
| Evaluation results | Adhesive strength | | | A | C |
| | Solvent resistance | | | C | S |
| | Platemaking properties | | | A | A |

As illustrated above, Examples 1 to 11 which used an adhesive for a heat-sensitive screen master containing the component A and the component B, wherein the mass ratio (A:B) between the component A and the component B was within a range from 35:65 to 5:95, exhibited excellent results for both solvent resistance and adhesive strength. Examples 1 to 10 which did not use a solvent in the adhesive for a heat-sensitive screen master exhibited superior results for the platemaking properties.

In contrast, Comparative Example 1 which used an adhesive in which the mass ratio (A:B) between the component A and the component B was 45:55, resulting in a lower proportion of the component B than the Examples, exhibited inferior solvent resistance compared with the Examples. Further, Comparative Example 2 in which an adhesive that did not contain the component A was used exhibited inferior adhesive strength compared with the examples.

According to embodiments of the present invention, it is possible to provide an adhesive for a heat-sensitive screen master that exhibits excellent adhesive strength and solvent resistance, and it is also possible to a heat-sensitive screen master that is obtained using this adhesive.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A heat-sensitive screen master comprising a screen printing mesh, an adhesive layer formed using an adhesive for a heat-sensitive screen master, and a thermoplastic resin film, wherein the adhesive comprises (A) at least one selected from the group consisting of a urethane prepolymer and a polyol comprising a polycarbonate polyol, and (B) a polyisocyanate, wherein a mass ratio (A:B) between the (A) at least one selected from the group consisting of a urethane prepolymer and a polyol comprising a polycarbonate polyol, and the (B) polyisocyanate is within a range from 35:65 to 5:95, and wherein an amount of the (A) at least one selected from the group consisting of a urethane prepolymer and a polyol comprising a polycarbonate polyol relative to the total mass of the adhesive for a heat-sensitive screen master is not more than 30% by mass, and the amount of the (B) polyisocyanate relative to the total mass of the adhesive for a heat-sensitive screen master is at least 70% by mass.

2. The heat-sensitive screen master according to claim 1, wherein the adhesive is a two-part adhesive.

3. A method for producing the heat-sensitive screen master according to claim 1, the method comprising bonding the screen printing mesh and the thermoplastic resin film using the adhesive for a heat-sensitive screen master.

4. The method for producing a heat-sensitive screen master according to claim 3, wherein the adhesive is a two-part adhesive.

5. The heat-sensitive screen master according to claim 1, wherein the (B) polyisocyanate comprises a modified product of a polyisocyanate.

6. The heat-sensitive screen master according to claim 5, wherein the modified product of a polyisocyanate comprises an isocyanurate-modified product of a polyisocyanate.

7. The method for producing a heat-sensitive screen master according to claim 3, wherein the (B) polyisocyanate comprises a modified product of a polyisocyanate.

8. The method for producing a heat-sensitive screen master according to claim 7, wherein the modified product of a polyisocyanate comprises an isocyanurate-modified product of a polyisocyanate.

9. The heat-sensitive screen master according to claim 1, wherein the (A) at least one selected from the group consisting of a urethane prepolymer and a polyol comprising a polycarbonate polyol comprises a urethane prepolymer.

10. The method for producing a heat-sensitive screen master according to claim 3, wherein the (A) at least one selected from the group consisting of a urethane prepolymer and a polyol comprising a polycarbonate polyol comprises a urethane prepolymer.

11. The heat-sensitive screen master according to claim 9, wherein the weight average molecular weight of the urethane prepolymer is within a range from 2,000 to 10,000.

12. The method for producing a heat-sensitive screen master according to claim 10, wherein the weight average molecular weight of the urethane prepolymer is within a range from 2,000 to 10,000.

13. The heat-sensitive screen master according to claim 1, wherein a mesh count of the screen printing mesh, which is a number of fibers per one inch, is within a range from 40 to 500.

14. The method for producing a heat-sensitive screen master according to claim 9, wherein a mesh count of the screen printing mesh, which is a number of fibers per one inch, is within a range from 40 to 500.

15. The heat-sensitive screen master according to claim 1, wherein the (A) at least one selected from the group consisting of a urethane prepolymer and a polyol comprising a polycarbonate polyol comprises a polycarbonate polyol.

16. The method for producing a heat-sensitive screen master according to claim 3, wherein the (A) at least one selected from the group consisting of a urethane prepolymer and a polyol comprising a polycarbonate polyol comprises a polycarbonate polyol.

* * * * *